Jan. 4, 1938.   P. FORCELLA   2,104,157
RAIL JOINT
Filed Feb. 21, 1935   3 Sheets-Sheet 1

Inventor
Pietro Forcella
By Pennie Davis Marvin & Edmonds
Attorneys

Jan. 4, 1938.  P. FORCELLA  2,104,157
RAIL JOINT
Filed Feb. 21, 1935   3 Sheets-Sheet 2
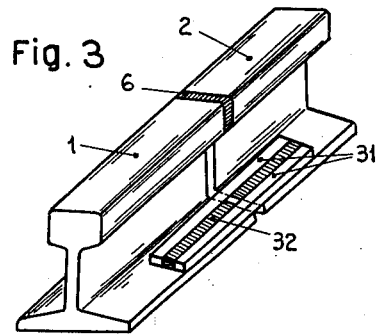
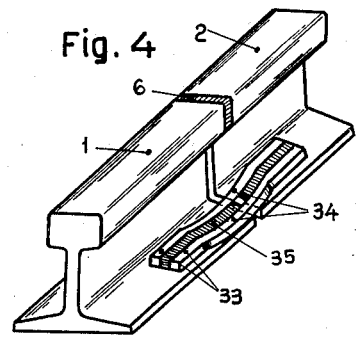
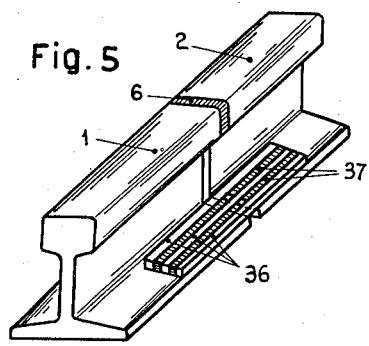
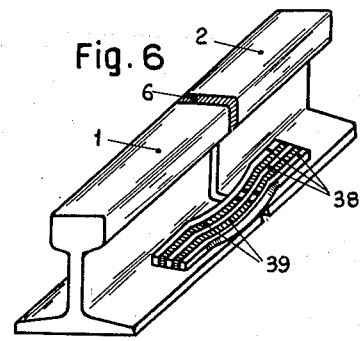
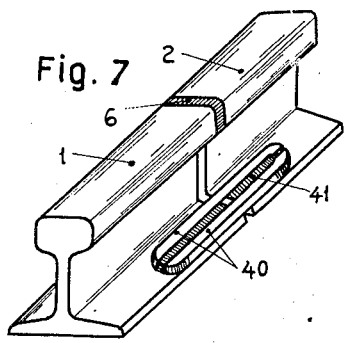
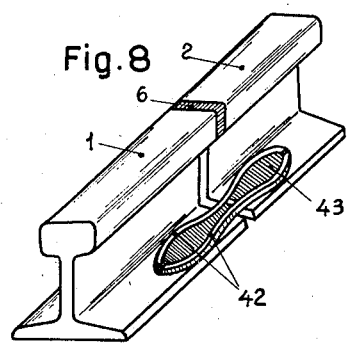

Jan. 4, 1938.　　　　P. FORCELLA　　　　2,104,157
RAIL JOINT
Filed Feb. 21, 1935　　　　3 Sheets-Sheet 3

Inventor
Pietro Forcella
By Pennie Davis Marvin & Edmonds
Attorneys

Patented Jan. 4, 1938

2,104,157

UNITED STATES PATENT OFFICE 2,104,157

RAIL JOINT

Pietro Forcella, Rome, Italy

Application February 21, 1935, Serial No. 7,597
In Italy February 21, 1934

2 Claims. (Cl. 238—164)

It is already known to assemble tramway or railway rails by welding together the ends of the rail head and foot and applying a weld seam on the longitudinal cheek edges.

The end and seam welding do not practically hold a long time owing to the fact that the welded parts are directly subjected to bending and tension stresses.

It is also known to weld together the ends of metal girders and pipings; the joints thus obtained are subjected to bending and tension stresses and do not ensure therefore the required strength and durability.

This invention has for its object to remove the above mentioned disadvantages and to provide a joint which is principally subject to shearing stresses and is therefore of long life.

The rail jointing method according to this invention is chiefly characterized by the use of weld blocks subjected to shearing stresses, which prevent the adjoining rail girder or piping sections from turning apart, protect and complete the end welding and confer to the joint a great strength and durability in view of the fact that the weld block which is held between the walls of a fish plate of suitable form is subjected to shearing stresses while other stresses to which the joint may be subjected are substantially resisted by the fish plate which may be of the desired size.

The welding is easily effected controllable and relatively quick.

The annexed drawings show by way of example several constructional forms of the rails joint according to this invention.

Figure 3 is a perspective view of a rail joint provided with weld blocks and butt straps.

Figs. 4, 5 and 6 show modified forms of the joint shown in Fig. 3.

Fig. 7 is a perspective view of a rail joint provided with weld blocks combined with a butt strap of annular form.

Figs. 8, 9, 10 and 11 show modified constructional forms of the joint shown in Fig. 7.

Figure 1:
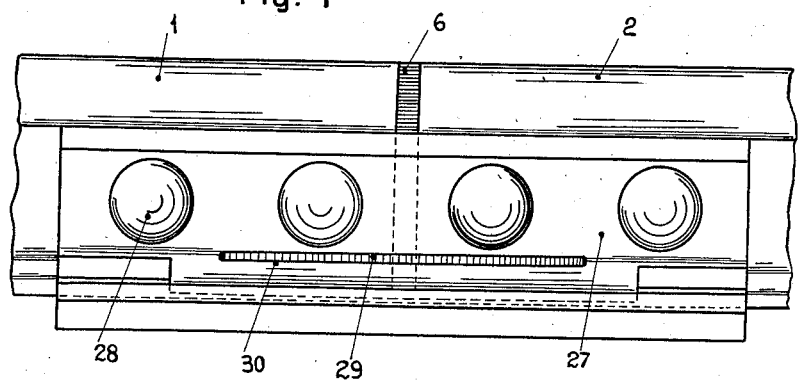
Figs. 1 and 2 show in elevation and cross section respectively a rail joint with apertured cheeks.
Figure 2:
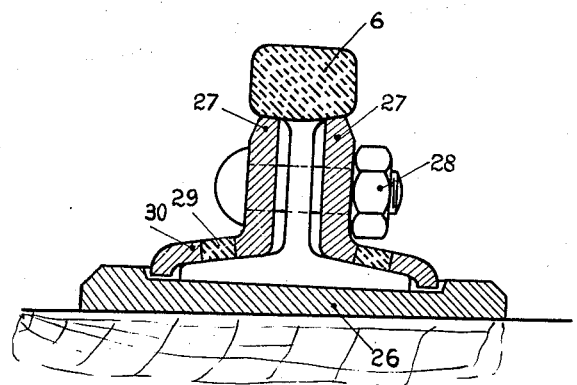

A welding which does not require parts of special form, is very cheap and may be effected without stopping the traffic is shown in Figs. 1 and 2. The rails 1 and 2 are supported by an ordinary base plate 26 and are connected together by means of ordinary cheeks 27 and bolts 28. The joint is completed by the end welding 6 of the rail heads and welding of the blocks 29 placed in a longitudinal opening 30 provided in the cheek flange.

Owing to the above arrangement the rail foot is assembled to the cheek and a section sufficiently wide is provided to prevent its receding from the contiguous one at the passage of a train, thus protecting the end welding of the rail heads, which alone would not last a long time.

A very cheap joint, according to this invention, in which the end welding of the rail foot is eliminated is shown in several constructional forms in Figs. 3 to 11. The heads of the rail ends 1 and 2 are jointed together by means of weld 6 as previously described. On the upper face of the rail foot butt straps are symmetrically arranged with respect to the longitudinal axis of the rails, each butt strap being constituted by two straight bars 31 parallel to each other and to the longitudinal axis of the rails. The grooves thus formed by the bars and foot of the rails or the end portions of said grooves are filled with welding material 32, so that the bars form a single piece with the rail foot which owing to the strong bond formed by the straps will not diverge under the load of the train, impairing the welding of the rail heads.

The welding efficiency is increased by suitably bending the bars, as illustrated by way of example in Fig. 4, in which said bars 33 are centrally curved at 34. The groove formed by the curved bars 33 and foot of the rails is filled with welding material 35.

When the joint is subjected to heavy loads, the number of bars of each butt strap will be increased as shown in Figs. 5 and 6. According to Fig. 5 each butt strap is constituted by three straight bars 36, between which welding material 37 is poured in Fig. 6; each strap is constituted by three curved bars 38 between which welding material 39 is poured.

The tension resistance of the butt straps may be increased without increasing the number of the bars of each strap if bars in the form of an opened or closed ring are used. It will be seen that by this arrangement the strength of the connection of the bars and foot of the rail, and therefore the resistance to the bending moment of the joint, are considerably increased.

Figures 7 to 11 show several constructional forms of said ring joints. According to Fig. 7 the bars 40 are bent over at their ends in such manner as to form an elongated split ring; the central space is filled with weld 41. According to the modified form shown in Fig. 8 the bars 42 are bent in 8 formation, also in this case the inner space is filled with weld 43.

Figure 9:
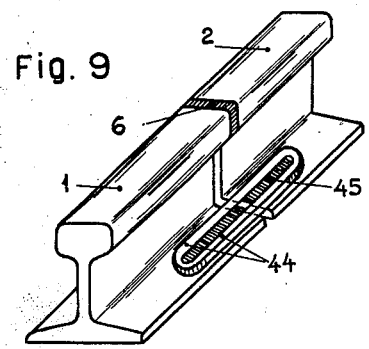
Figure 10:
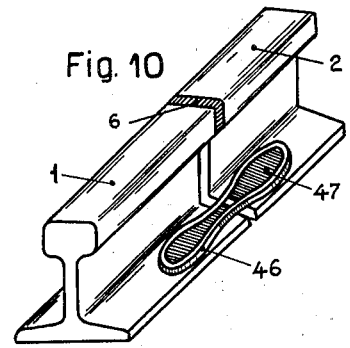

Instead of using separate bars as above described, an elongated one piece ring may be used; according to Fig. 9 the butt strap comprises a ring 44 and a welded block 45 which fills the space inside the ring; according to the modified form shown in Fig. 10 the ring 46 is bent in the form of an 8 and is filled with weld 47.

Figure 11:
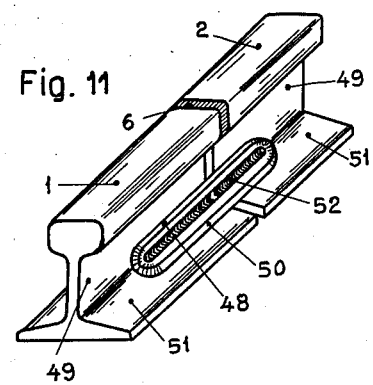

The bars or ring may also perform the function of cheeks, the use of which may therefore be eliminated thus obtaining a considerable economy. In said case some of the bars are advantageously arranged on the web, or the ring may be bent in such a way that a long portion of it adheres to the web of the rail. An example of this latter case is shown at Fig. 11, where the ring is bent substantially at right angles along the longitudinal axis; a branch 48 bears against the webs 49 of the rails, while the other branch 50 rests on the rail foot 51; the space inside the ring is filled, as usual, with weld 52.

Figure 12:
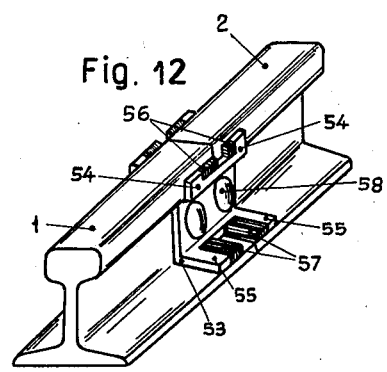
Figs. 12 and 13 are perspective views of a rail joint provided with weld blocks and fork cheeks.
Figure 13:
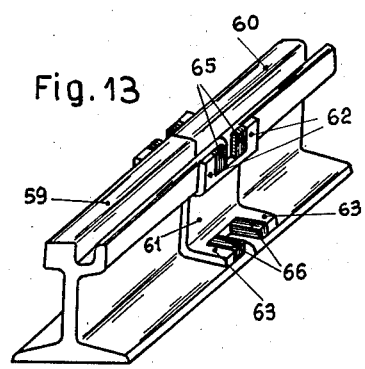

Figs. 12 and 13 show a jointing method which permits of abolishing the end welding both of the foot and head of the rails, and generally all hidden and therefore not easily controllable weldings.

The ends of the rails 1 and 2 are brought together and assembled by means of cheeks 53, at the upper edge of which are provided branches 54 embracing the head of the rails, while at their lower edge are provided branches 55 resting on the upper face of the foot of the rails.

In the clearance between the branches 54 are arranged two weld blocks 56 separate from each other and connected to the inner sides of the branches. In a similar manner weld blocks 57 are arranged in the clearance between the branches 55.

The joint is completed by bolts 58.

The upper branches of the cheek on the inner side of ordinary rails are shorter than those at the outer side, as shown in Fig. 12 to permit free passage of the wheel bead.

In tramway rail joints, as shown in Fig. 13, the height of the upper branches on the inner side is equal to that of the branches on the outer side. In said figure, 59 and 60 are the contiguous ends of the rail sections, 61 is the cheek provided with upper branches 62 and lower branches 63, against which are placed the weld blocks 65 and 66 respectively.

Figure 14:
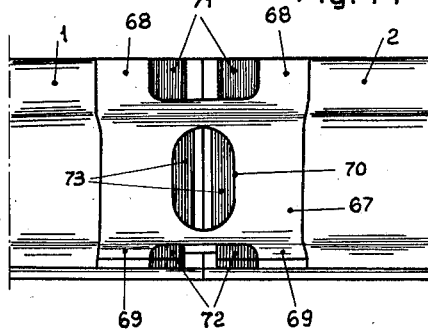
Fig. 14 shows a modified form of the joint provided with fork cheeks.

In the modified form shown in Fig. 14, the cheeks are provided in addition to the upper branches 68 and lower branches 69, with a central opening 70. Between the cheek branches and in the opening are arranged the weld blocks 71, 72 and 73 respectively. The weld blocks on the sides of the rail head, on the sides of the rail web and on the surface of the rail foot permit of obtaining an exceptionally strong joint.

The form, thickness and constructional details of the welding by means of weld blocks may be varied according to the requirements of each particular case without departing from the spirit of this invention.

What I claim is:

1. A rail joint including in combination with aligned rails, the adjacent ends of the rails defining a junction, means connecting the upper portions of the rails above the neutral axis, bar means positioned on the lower portion of the rails below the neutral axis and extending across said junction, said bar means defining a space and weld blocks welded to the rails and bar means within said space and free of said junction.

2. A rail joint including in combination with aligned rails, the adjacent ends of the rails defining a junction, means connecting the upper portions of the rails above the neutral axis, bar means positioned on the lower portion of the rails below the neutral axis and extending across said junction, said bar means being substantially in the form of an oblong ring defining a space and weld blocks welded to the rails and bar means within said space and free of said junction.

PIETRO FORCELLA.